US 7,926,057 B2

(12) United States Patent
Chan et al.

(10) Patent No.: US 7,926,057 B2
(45) Date of Patent: Apr. 12, 2011

(54) SCHEDULING OF COMPUTER JOBS EMPLOYING DYNAMICALLY DETERMINED TOP JOB PARTY

(75) Inventors: Waiman Chan, Poughkeepsie, NY (US); Joseph F. Skovira, Owego, NY (US)

(73) Assignee: International Business Machines Corporation, Armonk, NY (US)

( * ) Notice: Subject to any disclaimer, the term of this patent is extended or adjusted under 35 U.S.C. 154(b) by 1399 days.

(21) Appl. No.: 11/304,876

(22) Filed: Dec. 15, 2005

(65) Prior Publication Data
US 2007/0143760 A1   Jun. 21, 2007

(51) Int. Cl.
G06F 9/46   (2006.01)
(52) U.S. Cl. ...................................................... 718/102
(58) Field of Classification Search .................. 718/102
See application file for complete search history.

(56) References Cited

U.S. PATENT DOCUMENTS

| | | | | |
|---|---|---|---|---|
| 5,392,430 A * | 2/1995 | Chen et al. | ..................... | 718/102 |
| 5,671,361 A | 9/1997 | Brown et al. | .................. | 395/209 |
| 6,070,144 A * | 5/2000 | Ginsberg et al. | .................. | 705/9 |
| 6,625,646 B1 | 9/2003 | Skovira | .......................... | 709/102 |
| 6,694,345 B1 * | 2/2004 | Brelsford et al. | ............. | 718/100 |
| 6,738,893 B1 * | 5/2004 | Rozas | .............................. | 712/24 |
| 7,076,781 B2 * | 7/2006 | Skovira | .......................... | 718/102 |
| 2002/0194248 A1 | 12/2002 | Wood et al. | ................... | 709/102 |
| 2003/0135621 A1 * | 7/2003 | Romagnoli | .................... | 709/226 |
| 2003/0149717 A1 | 8/2003 | Heinzman | ..................... | 709/101 |
| 2004/0015973 A1 | 1/2004 | Skovira | .......................... | 718/103 |
| 2004/0199918 A1 | 10/2004 | Skovira | .......................... | 718/102 |
| 2005/0081208 A1 | 4/2005 | Gargya et al. | ................. | 718/100 |
| 2005/0235286 A1 * | 10/2005 | Ballew et al. | ................. | 718/100 |
| 2007/0127527 A1 * | 6/2007 | Dan et al. | ...................... | 370/477 |

FOREIGN PATENT DOCUMENTS

| | | |
|---|---|---|
| JP | 59180716 A | 10/1984 |
| JP | 8305671 A | 11/1996 |
| JP | 8315028 A | 11/1996 |
| JP | 2002007143 A | 1/2002 |

(Continued)

OTHER PUBLICATIONS

Jackson et al., Core Algorithms of the Maui Scheduler, 2001, pp. 1-16.*

(Continued)

Primary Examiner — Andy Ho
Assistant Examiner — Timothy A Mudrick
(74) Attorney, Agent, or Firm — Matthew W. Baca; Kevin P. Radigan, Esq.; Heslin Rothenberg Farley & Mesiti P.C.

(57) ABSTRACT

A facility is presented for scheduling computer jobs of a computing environment having a plurality of computing nodes. The facility includes scheduling N sequential computer jobs of a job queue until achieving a top job party, wherein $N \geq 2$, and the number of jobs in the top job party is dynamically determined by monitoring backfill window coverage of the computing nodes by the N scheduled jobs and automatically closing membership in the top job party once (i) all computing nodes are covered by at least one backfill window, or (ii) a backfill end time of at least one computing node is greater than or equal to a maximum wallclock limit of a set of job classes having the N scheduled jobs. Responsive to determining the top job party, the facility then backfill schedules jobs of the job queue around the top job party for execution.

20 Claims, 9 Drawing Sheets

FOREIGN PATENT DOCUMENTS

WO             WO0029943 A1     5/2000

OTHER PUBLICATIONS

Mounie et al., Efficient Approximation Algorithms for Scheduling Malleable Tasks, 1999, pp. 1-10.*

Zotkin et al., Attacking the Bottlenecks of Backfilling Schedulers, 2000, pp. 1-21.*

Y. Zhang et al., "Improving Parallel Job Scheduling by Combining Gang Scheduling and Backfilling Techniques," 14th International Parallel and Distributed Processing Symposium, IPDPS 2000, IEEE Computer Society Technical Committee on Parallel Processing, pp. 1-10 (May 1, 2000).

P. Jones et al., "Scheduling for Parallel Supercomputing: A Historical Perspective of Achievable Utilization", Job Scheduling Strategies for Parallel Processing, IPPS/SPDP'99 Workcshop, JSSPP'99 Proceedings, Lecture Notes in Computer Science, vol. 1659, (Apr. 16, 1999), Abstract Only.

Cynthia B. Lee, "Parallel Job Scheduling Algorithms and Interfaces", Department of Computer Science & Engineering, University of California, San Diego (clbailey@uscd.edu), pp. 1-16 (May 13, 2004).

\* cited by examiner

```
jobs {Jobid}
    nodes required by the job
    WCT nodes {nodeid}

Job running
        Jobid
        WCT
    BFW assignments
        Start
        End
    Freetime-Time between "now" and BFW start time
    Future Jobs
        Job id
            Future job start
            Future job end
```

*fig. 4*

SCHEDULING OF COMPUTER JOBS EMPLOYING DYNAMICALLY DETERMINED TOP JOB PARTY

TECHNICAL FIELD

This invention broadly relates to data processing techniques, and more particularly, to a backfill scheduling facility that schedules computer jobs employing a dynamically determined top job party comprising multiple computer jobs of a queue of computer jobs awaiting execution.

BACKGROUND OF THE INVENTION

Scheduling techniques are used to schedule computer jobs in a computing environment such that the resources of the environment are efficiently utilized. One type of scheduling technique is a backfill scheduling technique, which allows computer jobs to run out of order as long as the computer jobs do not effect the start time of a computer job already scheduled to execute. In particular, backfill scheduling techniques determine when a free set of computing nodes will be available at a future time and schedule one or more jobs to be executed at that time.

Backfill scheduling techniques have progressed over the years to become more efficient. However, further enhancements are still desired. For example, a need exists for a backfill scheduling facility that dynamically determines a number of computer jobs for inclusion in a top job party to be considered when backfill scheduling.

SUMMARY OF THE INVENTION

The shortcomings of the prior art and additional advantages are provided, in one aspect, through a method of scheduling computer jobs of a computing environment comprising a plurality of computing nodes. The method includes: scheduling N sequential computer jobs of a job queue until achieving a top job party, wherein $N \geq 2$, and the number N of computer jobs in the top job party is dynamically determined by monitoring backfill window coverage of the plurality of computing nodes by the N scheduled computer jobs and automatically closing membership in the top job party once (i) all computing nodes of the plurality of computing nodes are covered by at least one backfill window of at least one computer job of the N computer jobs in the top job party, or (ii) a backfill end time of at least one computing node of the plurality of computing nodes is greater than or equal to a maximum wallclock limit of a job class in a set of job classes comprising the N scheduled computer jobs; and responsive to determination of the top job party, backfill scheduling at least one computer job of the job queue around the N computer jobs of the top job party for execution by the plurality of computing nodes.

In further aspects, the number N of computer jobs in the top job party is less than a number of computer jobs in the job queue awaiting execution by the plurality of computing nodes, and the N computer jobs are N top or highest priority computer jobs in the job queue. Further, each computer job of the job queue has an associated computing node requirement and wallclock time indicative of an amount of time required to run the computer job, and the scheduling includes employing the computing node requirements and wallclock times of the N computer jobs in determining whether to close membership in the top job party. Still further, the scheduling includes assigning a start time to each of the computer jobs of the N computer jobs in the top job party.

In yet further aspects, the dynamically determining includes sorting computing nodes of the plurality of computing nodes by earliest free time initially, and for each computer job considered for inclusion in the top job party, determining whether free time of at least one computing node is greater than or equal to a wallclock time for the computer job considered for inclusion, and if so, saving the at least one computer node on a potential node list for execution of the computer job, and for each node of the potential node list, setting a backfill end time equal to a projected end time of the computer job once running on the computer node, and setting a return code equal to a job ID for the computer job. In one embodiment, closing membership in the top job party includes determining that all computing nodes of the plurality of computing nodes have a backfill start time greater than zero, thereby indicating closure of membership.

When there are insufficient computer nodes in the potential nodes list to execute the computer job, the method further includes sorting the plurality of computer nodes by earliest backfill end time and pushing computer nodes into a potential node stack by earliest backfill end time until a sufficient number of computer nodes are accumulated to execute the computer job, and determining whether at least one additional computer node of the plurality of computer nodes has a same backfill end time as the backfill end time for a last computer node on the potential node stack, and if so, adding the at least one additional computer node with the same backfill end time to the potential node stack, and removing computer nodes from the potential node stack in reverse order to placement on the stack, the removed nodes being designated to execute the computer job.

Systems and computer program products corresponding to the above-summarized methods are also described and claimed herein.

Further, additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 4 depicts data structures for a top job party backfill algorithm, in accordance with an aspect of the present invention;

BEST MODE FOR CARRYING OUT THE INVENTION

Figure 1:
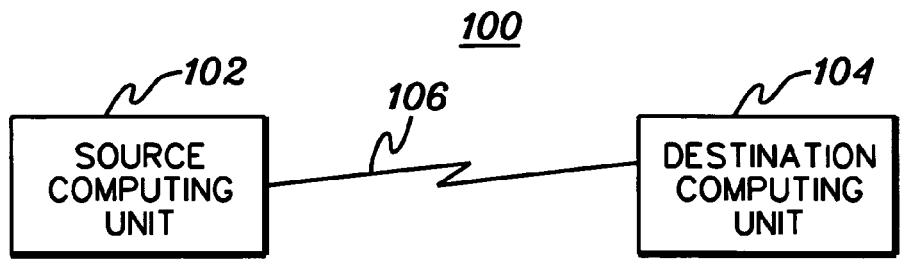
FIG. 1 depicts one embodiment of a computing environment to incorporate and use one or more aspects of the present invention.

One embodiment of a computing environment to incorporate and use one or more aspects of the present invention is initially described with reference to FIG. 1. In one example, computing environment 100 is a grid computing environment including, for instance, a source computing unit 102 and one or more destination computing units 104. A computing unit (102 and/or 104) includes one or more nodes capable of processing jobs or applications. In a computing unit having a plurality of computing nodes, the nodes are coupled to one another via, for instance a LAN or other type of connection. A node is, for instance, a LINUX workstation; a p-series machine, such as a pSeries 690, offered by International Business Machines Corporation of Armonk, N.Y.; or a general parallel machine. Various other types of nodes can also be employed, and therefore, those described herein are just examples, A computing unit may include homogeneous or heterogeneous nodes, and similarly, each unit may be the same or different from one another. The computing units are coupled to one another via, for instance, a high-speed link 106, such as GigaBit Ethernet, or the IBM High Performance Switch (HPS). Other types of links, switches or other connections may also be used.

To efficiently utilize the resources of the computing environment, scheduling techniques are used to schedule execution of computer jobs of the environment. One type of scheduling technique is a backfill scheduling algorithm that determines when resources will be available at a later time for use by waiting jobs. One example of a backfill scheduling technique is described in "The EASY-LoadLeveler API Project", Job Scheduling Strategies for Parallel Processing, edited by Dror G. Feitelson and Larry Rudolph, pp. 41-47, Springer-Verlag, 1996, Lecture Notes on Computer Science, Vol. 1162, which is hereby incorporated herein by reference in its entirety.

The total solution for the backfill scheduling algorithm is NP complete (see E. Lawler, *Combinatorial Optimization Networks and Matroids*, Saunders College Publishing, Fort Worth, Tex. (1976)). This implies that the optimal scheduling solution (i.e., the least total delay solution for all running jobs) can be solved only by using a non-polynomial time algorithm. As complexity of the job scheduling grows, the solution grows exponentially. A heuristic for this issue is to consider only the top job in backfill scheduling. This top job is referred to as the "top dog" in International Business Machines' LoadLeveler™ notation. But this presents a problem. The second (and third, to N) waiting jobs in the job queue might be delayed by the backfill operations. In addition, although backfill guarantees a start time to be no greater than the original computation, with the simple algorithm, jobs in the future are not assigned a start time. This makes it difficult to report or project the start time of any job in the queue to either users or administrators.

Presented herein is a new technique for selecting a number of top jobs for consideration when using a backfill scheduler. Instead of using a single "top dog" job to establish the backfill parameters of idle jobs further in the queue, a "dog party" of jobs (also referred to herein as a "top job party") is considered during the backfill algorithm. The dog party solution prevents the job start delay for any idle job deep in the queue and effectively solves the free-node problem. Also, instead of requiring an administrator-selected estimate of the limit for this job set (as in prior solutions), presented herein is a dynamic determination of a termination point for job inclusion in the top dog party. Data structures for implementing the facility are presented, which allow straightforward visualization of the future job schedule. Numerous advantages of the technique are described, including the need for only minor modifications to existing scheduling algorithms to provide superior performance, efficient CPU utilization to provide the additional functionality, ease of administration when implementing the concepts, and graphical capabilities for the future job queue.

Conservative backfill, described by Dror and Feitelstein (see C. Lee, "Parallel Job Scheduling Algorithms and Interfaces", Department of Computer Science and Engineering, University of California, San Diego (May 13, 2004)) provides some relief for the problem. However, the tunable provides only a crude adjustment. Reservation depths may be set to a discrete value, or to a large value, so that all jobs in the queue are considered. The scheduler administrator may have had no idea what the value of the discrete setting should be, since this is dependent on the job queue, which changes stochastically depending on the set number of users currently submitting jobs. Setting the value to LARGE considers the entire queue, developing a schedule for all jobs in the queue leading to large scheduler run times, that is, times approaching the NP complete limits for the algorithm. Thus, the crude termination control of this approach is essentially an unworkable parameter.

The solution presented herein considers more than just a first waiting job (i.e., the top dog) in the backfill algorithm. It computes the future job schedule for a number of top waiting jobs (i.e., a dog party or a top job party). The difference is that the top job party algorithm provides clear termination control for the computation of additional computer jobs included in the backfill computation. This dynamically determined stop point for the enhanced algorithm is independent of the nature of the waiting job queue. Advantageously, the top job party backfill approach presented herein prevents a backfill job from delaying the start of the second through Nth waiting job in such a way that excessive computational time is avoided and administrator setup is maintained at a minimum.

Before proceeding further, the following terms employed herein are defined:

Backfill Window (BFW): This is the time in the future the backfill scheduler has computed that an idle job will run. The resources for the job are available for this amount of time to run any other idle job that can complete within the BFW time. BFW is associated with a job ID, for example, BFW1 indicates the backfill window computed for waiting job 1.

Wallclock Time (WCT): This is the time estimate provided by the user for a job submitted to the job scheduler. WCT is also associated with a job ID where WCT1 is the wallclock time for job 1.

Running Job: A job which the scheduler has started on free system resources, i.e., free computing nodes.

Idle Job: A computer job on the job queue waiting to run.

Top Dog (or Top Job): A first or top waiting job in the job queue which is considered by the backfill algorithm.

The thrust for the dog party algorithm comes from the "free node" problem. Classic Backfill heuristics (e.g., the LoadLeveler™ Parallel Back Scheduler (commercially available from International Business Machines Corporation), and the Maui External Scheduler (supported by Maui High Performance Computing Center of Maui, Hi.)) can be broken into three parts:

First, idle jobs are started beginning at the top of the waiting job queue as long as there are free resources.

Second, once an idle job cannot be started because of a lack of free resources, the BFW is computed for this job and resources targeted for this waiting job are planned to be available once the BFW expires.

Third, the remainder of the waiting job queue is scanned to determine if a job can fit in the BFW protected resource (s). This final step is the backfilling of smaller jobs onto free resources in such a way that the start time of the top dog job is not delayed.

Figure 2:
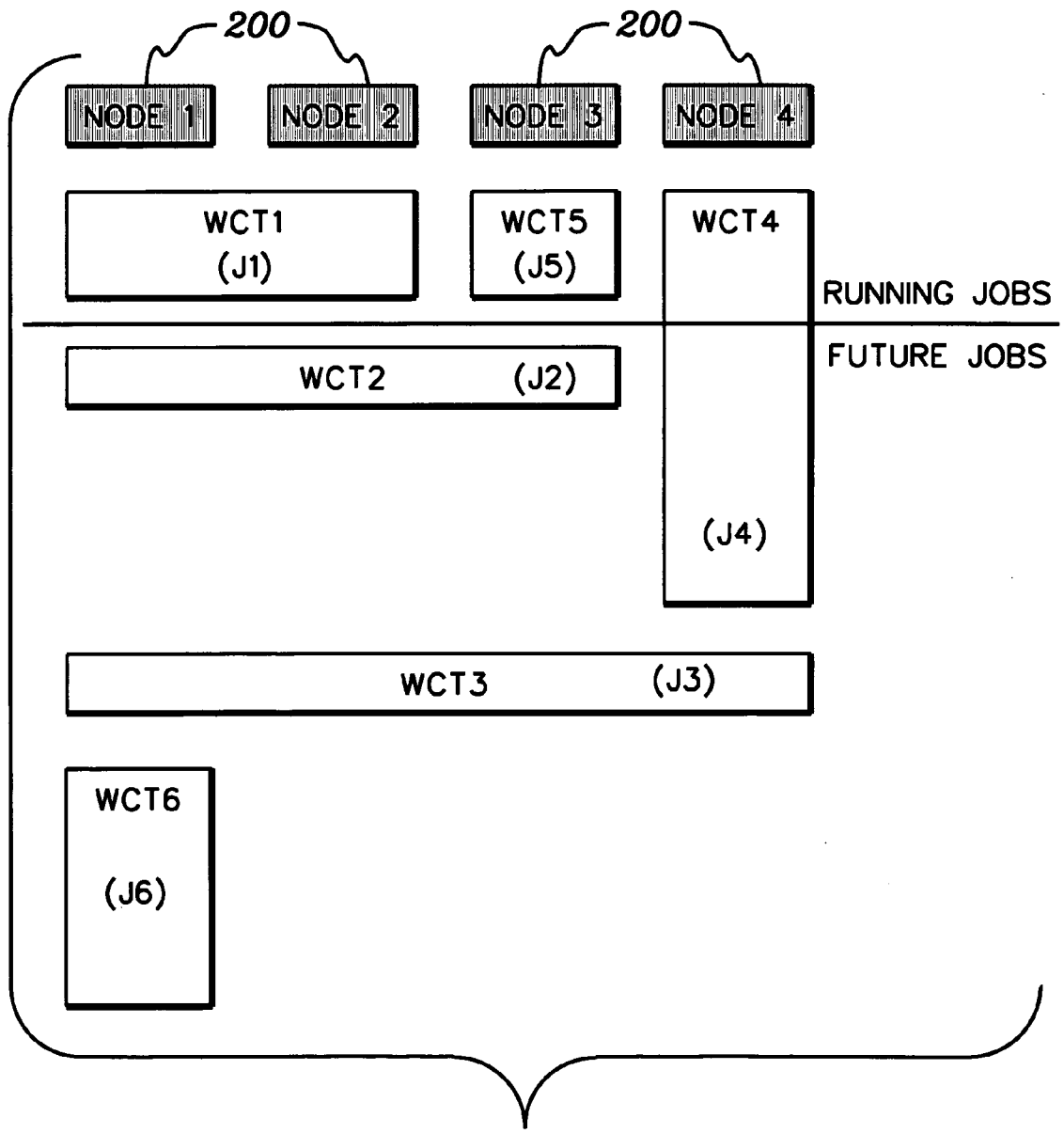
FIG. 2 depicts one example of job backfill scheduling employing a traditional backfill scheduling algorithm.

This algorithm works quite well for most job queue situations. However, there are cases where idle jobs further in the queue are impacted by backfill decisions. Note that, in the second step of the backfill algorithm, resources reserved for the waiting job are protected. However, any other resources on the machine are not protected. It may be possible that a job deep in the queue could start on the unprotected nodes and delay the start time of the second waiting job. FIG. 2 shows an example of this problem. A simple, 4-node parallel machine or computing environment is shown. All 4 nodes are initially idle. Three jobs are on the idle job queue. Each node includes a resource requirement (number of nodes) and a wallclock estimate as set forth in Table 1.

TABLE 1

| Job ID | Nodes | WCT |
| --- | --- | --- |
| J1 | 2 | 2 |
| J2 | 3 | 1 |
| J3 | 4 | 1 |
| J4 | 1 | 6 |
| J5 | 1 | 2 |
| J6 | 1 | 3 |

In the example, job1 runs on nodes 1 and 2 and will run on these nodes for WCT1, or 2 hours. Job2 requires 3 nodes so it cannot start right away. The algorithm determines that it will run in 2 hours (BFW2=2 hours) and will use nodes 1, 2, and 3. Nodes 1 and 2 are already busy, but this computation implies that node 3 may run a job in the queue that completes in less than 2 hours. Next, the scheduler attempts to backfill the free resources, i.e., nodes 3 and 4. Job3 is skipped since it requires 4 nodes. Job4 is scheduled on node 4. Node 4 is not protected by BFW2 so job4 is free to run. Note that running job4 on node 4 will not effect the start time of job2. The original backfill algorithm requirements are maintained. Job5 is backfilled onto node 3. Node 3 is protected by BFW2, but job5 will run within 2 hours so it will not impact the start of job2. Finally, job6 will run after job3 completes.

The problem is that, by placing job4 on node 4, the 6 hour run time of job4 will delay the start time of job3. Note in the figure that job3 must now wait for job4 to complete before it can run. This "free node" problem occurs when only a single top dog job is considered.

One possibility to avoid this problem is to completely compute the future job start schedule for all waiting jobs on the queue. This wouldn't be a bad idea for the short example of FIG. 2, but when a job queue approaches thousands of jobs, the computational time needed to plot every job becomes extreme.

In order to simplify the computational load, a rule needs to be established for the early dynamic termination of the BFW computation. As noted, an integer number may be used to gate the computation. But, depending on the selection of this limit and the current job queue, there is no guarantee that the limit will prevent the problem illustrated in FIG. 2.

The novel facility proposed herein proposes ending the BFW computation once each node resource has been covered by an arbitrary backfill window from any job (a capped backfill window). This introduces a number of additional facets to the existing backfill algorithm:

1) A method for computing "stacked" BFW times is needed.
2) The current top dog algorithm is extended to compute the future start times of not one, but a number of top dog candidates (or, the computation of an entire dog party).
3) A mechanism is developed to monitor BFW coverage of the nodes and switch to backfill job scheduling once all nodes are covered (i.e., membership in the top dog party is closed).
4) Variable BFW depths for each node are considered.

Figure 3:
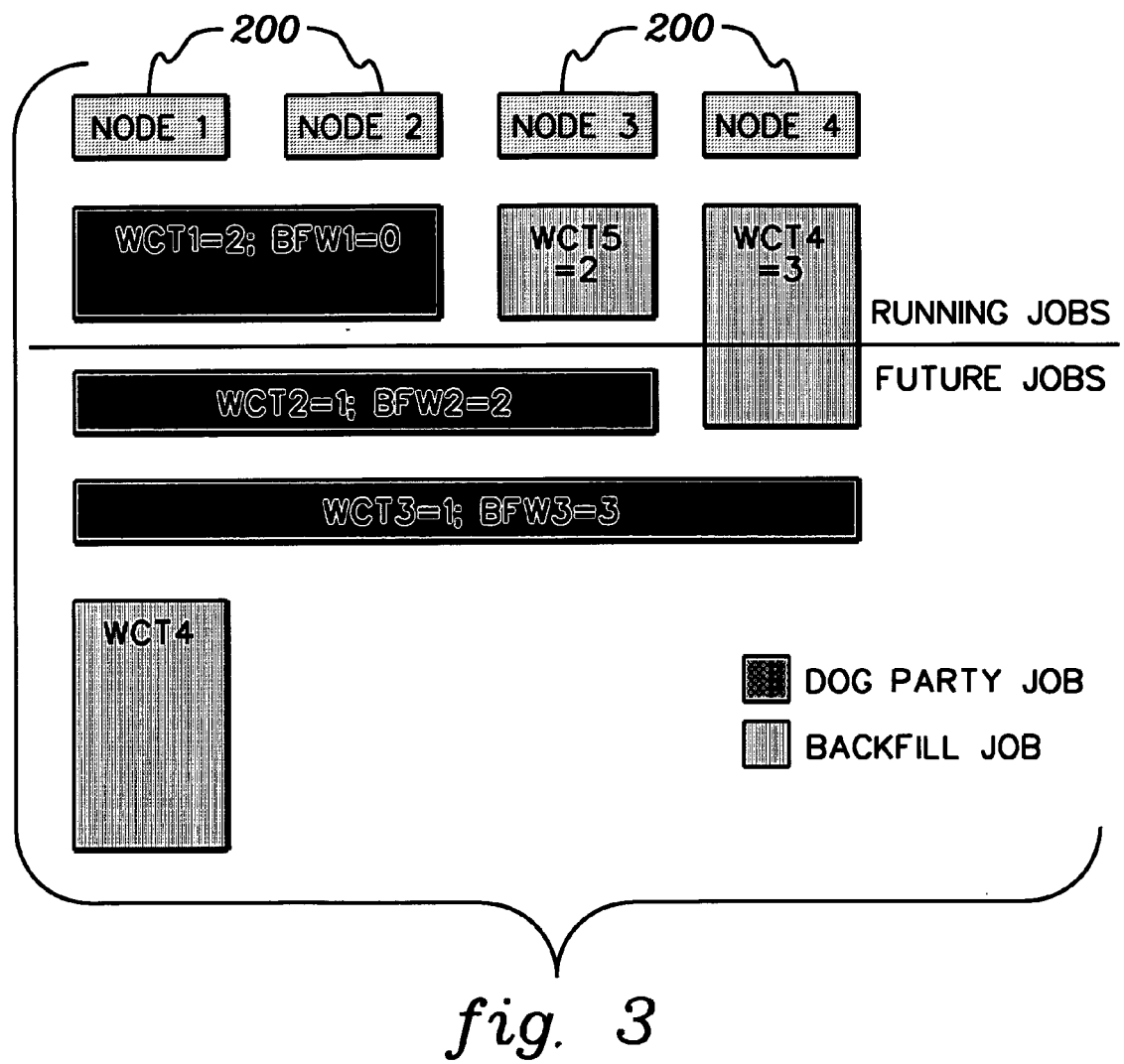
FIG. 3 depicts an example of backfill scheduling employing a top job party (or "dog party") backfill approach, in accordance with an aspect of the present invention.

This disclosure presents methods to implement each of these new features. First, consider stacked BFW times. Using the job queue of FIG. 2 as an example, the stacked BFW rules may be developed. The following steps are illustrated in FIG. 3.

1) For the running job, J1, WCT1 is originally 2 hours. As time passes:

$WCT1 = (\text{JobStartTime} + 2 \text{ hours}) - \text{TimeNow}$

This means that, as time passes, the time reserved for the running job, J1, will be reduced.
2) For running job J1, BFW1=0. The BFW for any running job is zero simply because a running job need not wait for any time to run—it is already running.
3) For waiting job 2, BFW2=BFW1+WCT1=0+2=2 hours (initially). Note that this formula will reduce BFW2 as WCT1 is reduced.
4) Since jobs in queue order are considered, J3 is next. Note that queue order is arbitrary and may depend on any site determined job ranking. For this argument, assume jobs are ranked by earliest submission first. Since J3 needs all the nodes, it must compute its backfill window based on the node with the largest BFW in the node set. Any of the nodes protected by job 2 are equivalent in this computation which implies the rule BFW3=BFW2+WCT2, or, BFW3=WCT1+WCT2. Note that, by induction, this method for determining BFW(N+1) now applies for all jobs in the queue.

At this point, all nodes are covered by a BFW limit so the algorithm may switch to backfill scheduling. This "capped backfill", where each node is protected by at least one BFW from a future job, marks the termination point for this portion of the algorithm. The dog party in this case consists of job1, job2, and job3 as the start time for each has been computed into future schedule time.

Regarding node selection for the jobs in the dog party, the backfill algorithm in this disclosure accumulates free nodes first. However, if it must wait for a single backfill protected node, it will consider all the nodes associated with this parallel job first since they will become free simultaneously. Because the job must wait for one node, it makes sense to wait for all protected nodes, thus freeing unprotected, or less protected nodes, for other jobs. In addition, selection of nodes is based solely on idle or busy states. Clearly this could be extended to include additional resource matching functions without loss of generality to the new algorithm.

As noted above, one method for dynamically determining the top job party involves capped backfill coverage for all nodes. Using this technique, membership in the top job party is closed once each node has a backfill time associated with it. As an alternative implementation, job classes associated with the jobs may be employed. Job classes typically include definitions for a maximum wallclock limit allowed for a job within the class. This is a limit for how long the job is allowed to execute on the system. If there are a number of job classes, there will be a maximum wallclock limit in the set of all job classes on the job queue. Using this maximum wallclock limit, it is possible to define an alternative termination point for the formation of the top job party. Recall that the top dog party is formed precisely to protect free nodes from being committed to work far into the future, thus effecting jobs deeper in the queue. Using the job class wallclock limit, it is possible to ensure that free nodes are protected. First, the maximum wallclock limit from the set of possible job classes is determined (and note that it is guaranteed that no job will run longer than this maximum limit). Next, jobs are scheduled up to the point that the first member of the top job party is determined. This is the first job which cannot run because there are not enough node resources available. Next, the top job party is computed as described herein. To terminate the top job party computation using the maximum wallclock limit, the backfill end time of all currently busy nodes must be greater than or equal to the maximum wallclock limit. Once the busy nodes reach this limit, it is guaranteed that any job run on a free node will not impact a future schedule since, at this point, any job run on a free node can run no longer than the maximum wallclock time.

As a further consideration, depending on the number of resources, class definitions, and the state of the job queue, class termination might be reached prior to capped backfill termination of the top job party algorithm. The opposite is also true given the stochastic nature of the system. Therefore, using both methods in an implementation of the top job party algorithm may be advantageous.

Once the dog party has been established, backfill scheduling may begin. Note that with the current future schedule, node 3 has a 2 hour window, after which job2 is guaranteed to run, and node 4 has a 3 hour window, after which job3 is scheduled to run. Compare this to the scheduling of FIG. 2 where node 4 was unprotected by a backfill window. The scheduler considers job4 for backfill, but WCT4=6 is too long for the job to fit in any available backfill window. Job5 is considered and started on node 3 since WCT5≦BFW2. Finally, job6 is started on node 4 since WCT6≦BFW3.

Note that this new top job party algorithm preferably performs a "minimum fit" for a backfill job. For example, job5 could have easily run on node 4 as well as node 3. However, the algorithm considers the minimum BFW time which will run all tasks of a parallel job (in this case, job5 has only a single task). This maximizes the use of available backfill time windows.

Finally, to complete the example, job4 will be scheduled after the current scheduling cycle completes. Because it cannot be started as a backfill opportunity, it must wait for the next free resource after the current dog party runs. In the case of the FIG. 3 example, this will occur once job3 completes. In fact, job4 will be the first member of a new dog party to be computed after the current sequence of scheduled jobs moves through the system. Note that FIG. 3 is a snapshot of an evolving job schedule. In an actual case, there are a number of events that effect the evolution of the future job schedule. Jobs may finish early, due to either a problem with the job or an overestimation of the wallclock time by the user. Jobs may also be cancelled by users before they run. Any of these events will alter the current schedule illustrated in FIG. 3, which will cause a re-computation of the schedule by the algorithm.

The above example illustrates various aspects of the dog party algorithm. To explore the algorithm, test code was written in PERL to test the algorithm and develop data structures in order to place the algorithm into actual scheduler code.

Each of these new features was tested using PERL code, simulated machines, and job queues. The data structures included in the PERL code include structures for the jobs in the job queue and the node resources. FIG. 4 shows the organization of the data structures.

The "jobs array" contains essential information used for job scheduling including the number of nodes required by the job and the WCT, or how long the job is expected to run. The "nodes array" contains a number of new features used to track the additional scheduling requirements of the dog party algorithm. The "job running" field contains the job ID and WCT of the job currently running on this node. The "BFW assignment" is a field which shows the start and end of the BFW reservation time. This field accumulates the span of backfill window which may be applied because of the scheduling of several jobs at future times on this node. The "freetime" field indicates how much time is available for a job to backfill on this node—this is the time between time now and the BFW start field. Finally, "Future Jobs" is a structure used to plot the job IDs of jobs assigned in the future to this node. Included with each job ID is a future start and end time.

Using these two data structures, the dog party simulation may be performed. Psuedocode for the routines used follows:

```
Dogtest (NumJobs, NumNodes, TestNodes, RandSeed)
    # The DogTest routine initializes the job and nodes arrays then
    calls
    # scheduleJob to place each job in the future schedule
    # NumJobs = number of jobs to build and submit
    # NumNodes = largest parallel job to generate
    # TestNodes = Numer of nodes in TEST parallel machine
    # RandSeed = where to start random number generator
    Create a randomly distributed job queue - initialize job structure
        Number of nodes = range between 1 and NumNodes
        Wallclock time ranges between 1 and 30
    Initialize node structure - all nodes initially free
    Foreach job in job array
        LastJob = ScheduleJob (ThisJob)
        Quit loop if LastJob is set
    Endfor
ScheduleJob (jobid)
    # ScheduleJob considers a job given the current entries in the
    $nodes array.
    # The scheduler attempts to first start the job. If it is not
    possible to start the job
    # immediately, the BFW for this job is computed.
    For each node (sorted by smallest FreeTime first) {
        See if FreeTime is greater than or equal to WCT for
        this job
        If it is, save it on the potential list of nodes
        If enough nodes are gathered, quit this for loop.
    Endfor
    If enough nodes gathered for this job {
        Set FreeTime = 0 for each gathered node
        Set $node runJobid = this job
        Set $node WCT to WCT for this job
    } else {
    # Not enough nodes were gathered for this job,
    compute when it will run and
    # which node resources it will use
    For each node (sorted by EARLIEST BFW end time)
        If (more nodes are needed) OR
            (all nodes at same BFW end time are not yet
            gathered) {
                Push this node onto the potential node
                array
```

-continued

```
        } else {
                end the loop checking each node
        endif
    endfor
    For the number of needed nodes {
    Pop off a potential node from the node array
    Adjust this nodes BFW end and start times
    Add this job to the nodes FutureJob structure
    (jobid, start, and end times)
        Endfor
    Endif of check for enough nodes gathered for the job
    if all nodes have backfill time set (that is all nodes are
    covered by at least 1 BFW)
        return (jobid)
    } else {
        return null
endif
```

Figure 5:
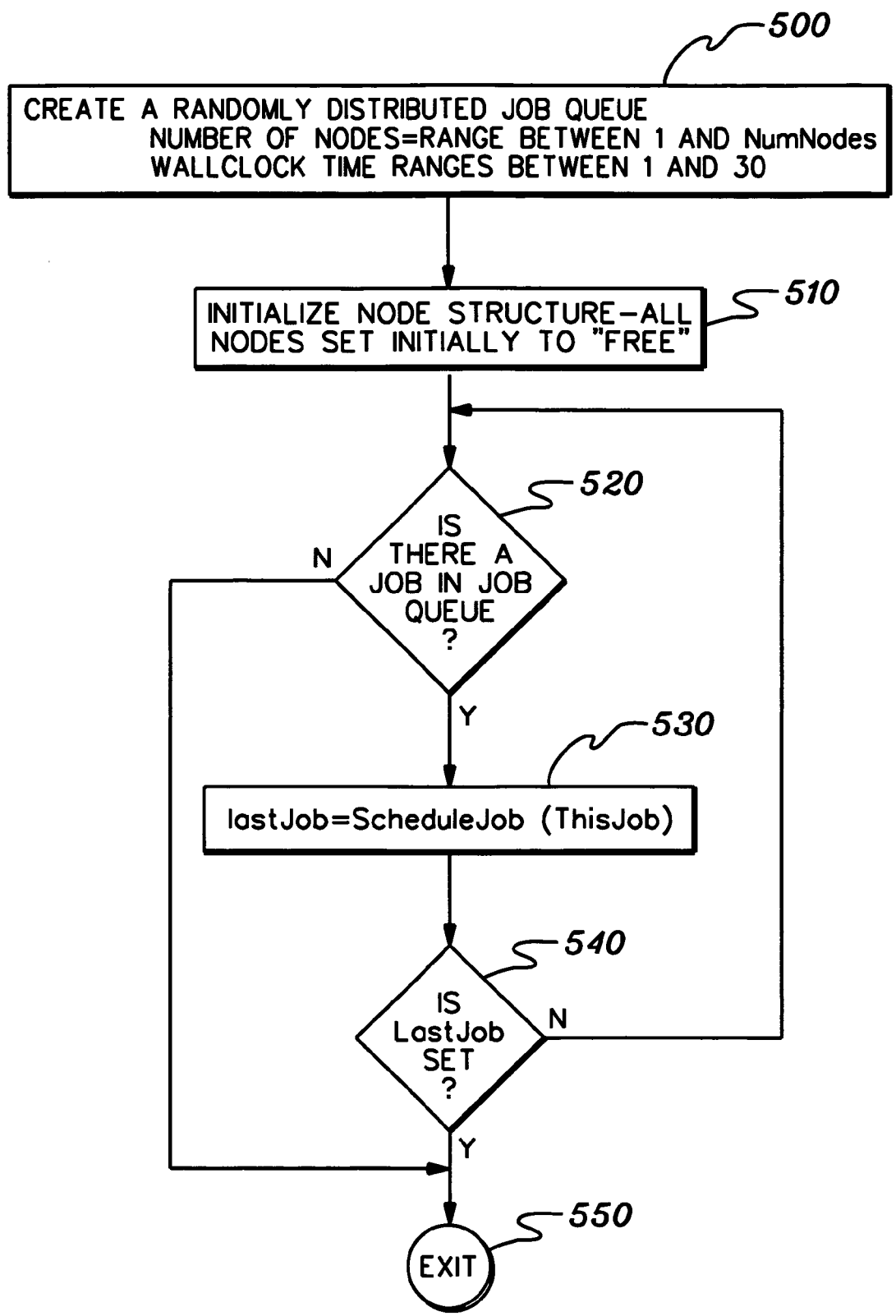
FIG. 5 is a flowchart of one embodiment for calling a schedule job subroutine for computer jobs on a job queue until closure of the top job party in a top job party scheduling algorithm, in accordance with an aspect of the present invention.
Figure 6A:
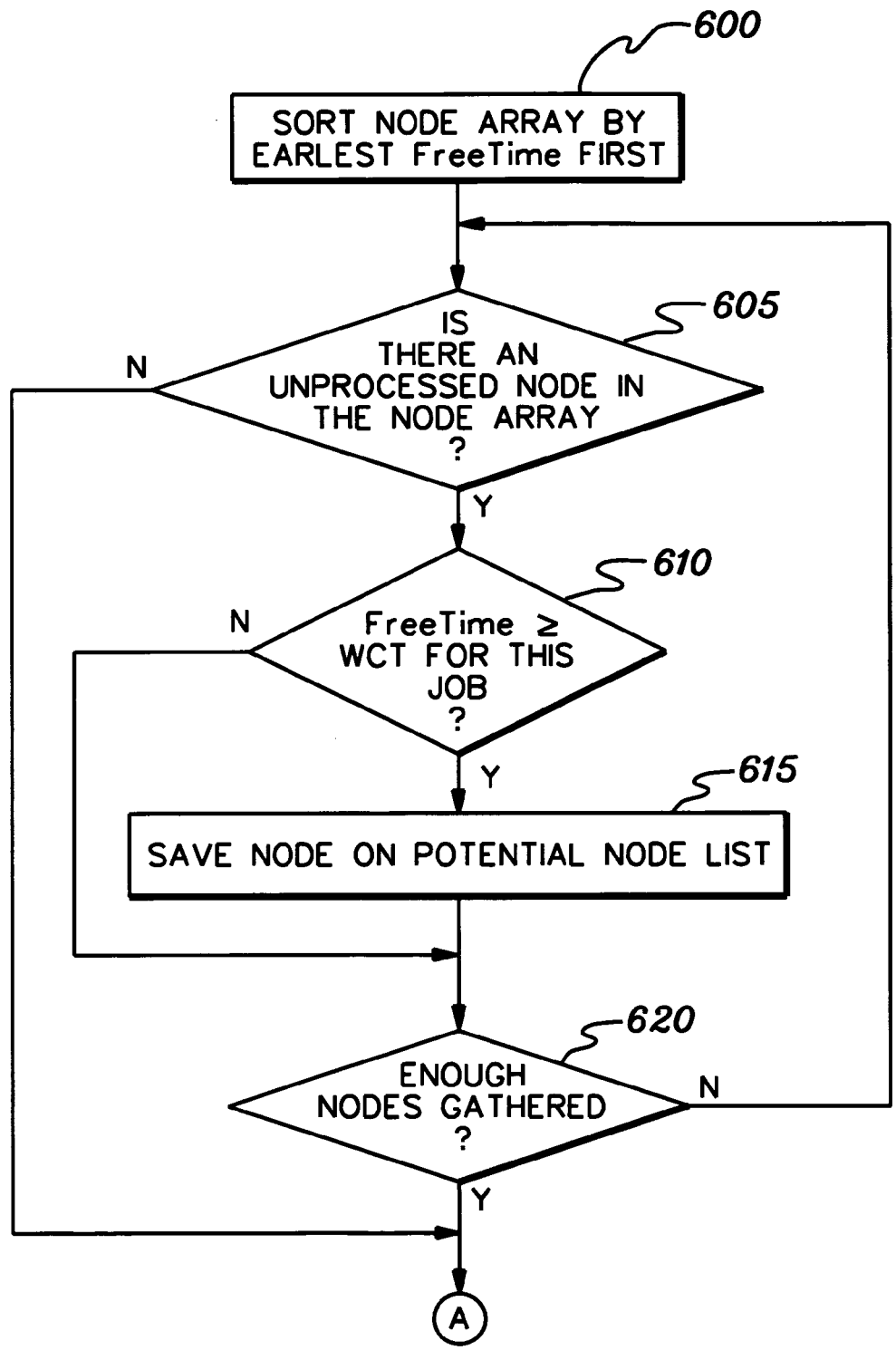
FIGS. 6A-6D are a flowchart of one embodiment of a schedule job routine for scheduling computers job of the job queue in the top job party of the top job party scheduling algorithm, in accordance with an aspect of the present invention.
Figure 6B:
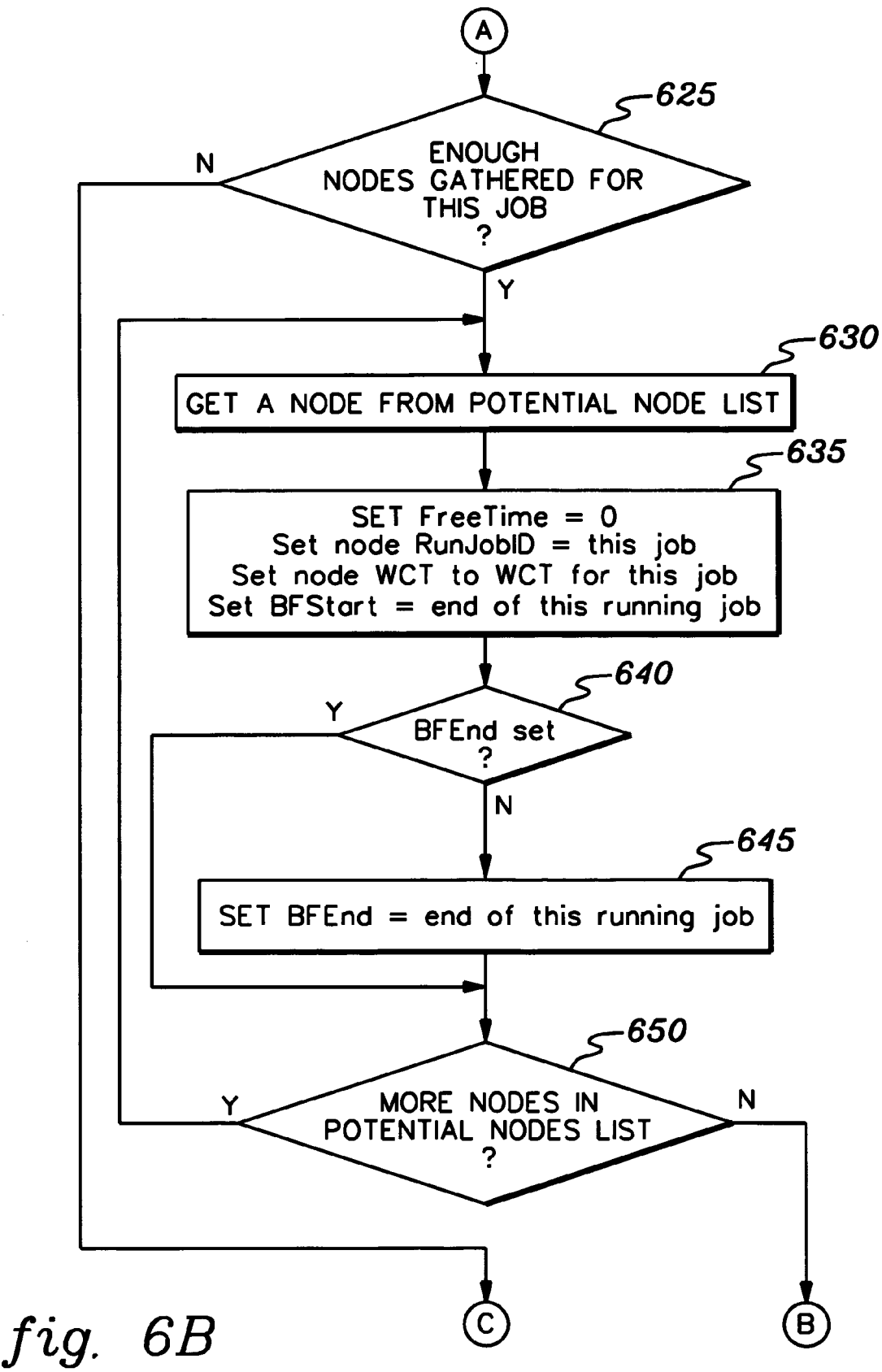
Figure 6C:
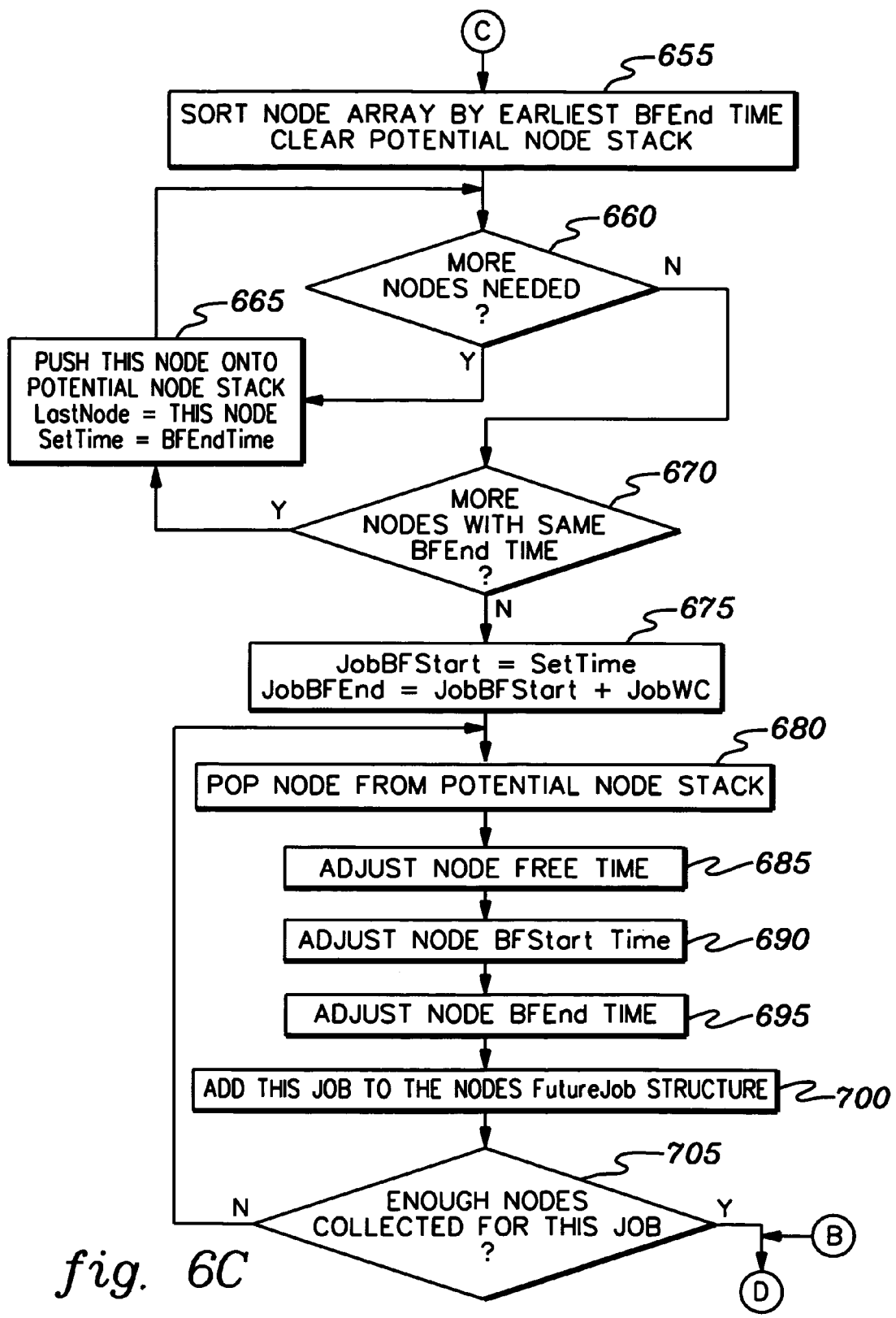
Figure 6D:
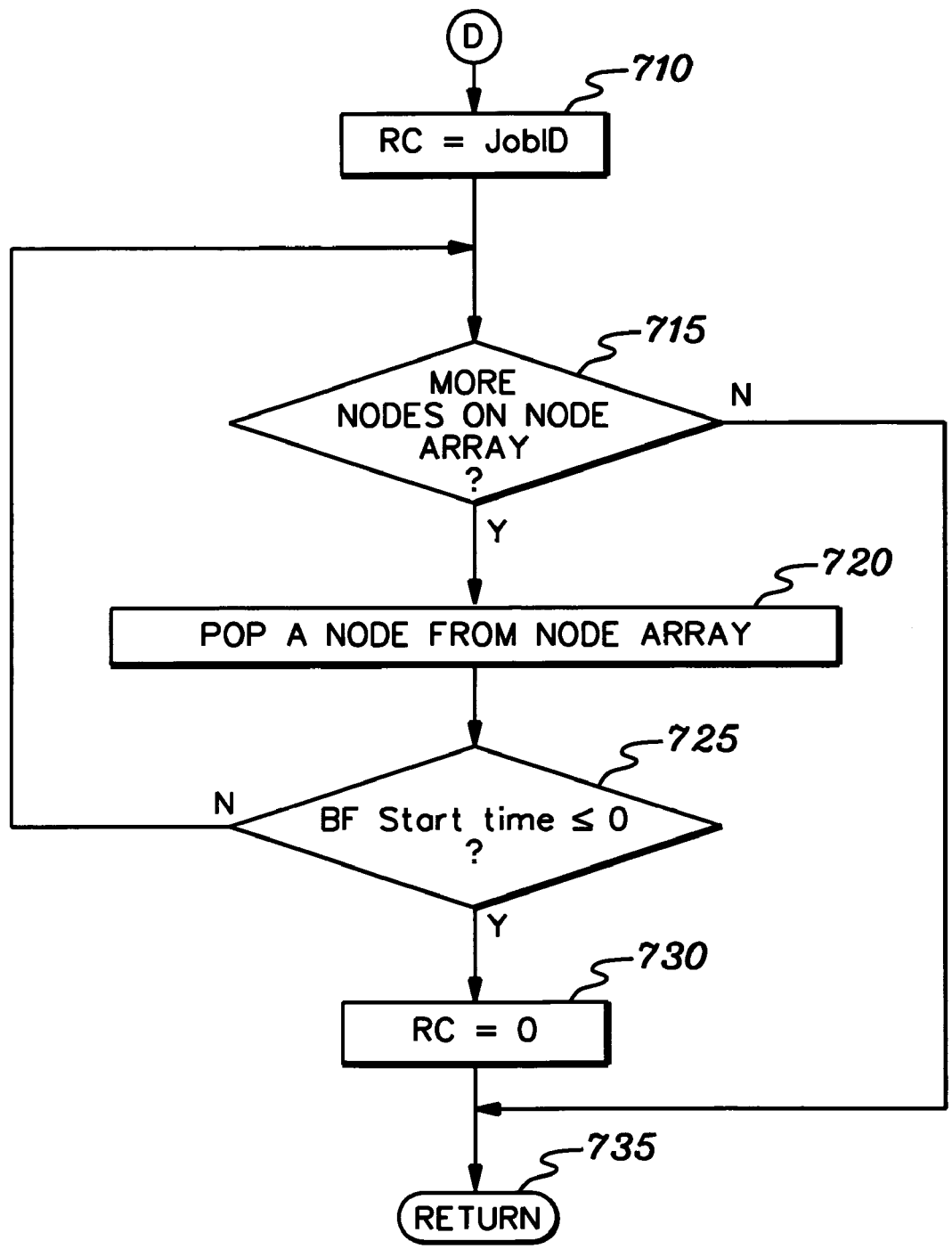

The above-noted routines are alternately expressed in the flowcharts of FIGS. 5-6D. FIG. 5 depicts one example of a process for calling a schedule subroutine for computer jobs of a job queue, that is, until identifying a dynamically determined closure point for the top job party in the top job party scheduling algorithm presented herein. Initially, a randomly distributed job queue is created 500, which includes a number of nodes, ranging between 1 and NumNodes, and a wallclock time for each node is provided, which ranges between, for example, 1 and 30 minutes. The plurality of computing nodes of the computing environment (or machine) are initialized by setting all nodes initially to "free" 510. Processing then determines whether there is a job in the job queue 520, and if "yes", then the subroutine ScheduleJob is called to schedule the first job in the job queue. The subroutine ScheduleJob returns a return code "LastJob" 530. (One embodiment of the ScheduleJob routine is described below with reference to FIGS. 6A-6D.) Once this job is scheduled, processing determines whether the return code "LastJob" has been set 540. If "no", then processing returns to obtain a next job from the job queue for inclusion in the top job party (or dog party). Once the return code LastJob has been set, or if there are no additional jobs in the job queue, then the number of jobs in the top job party has been determined 550 (with all nodes having been covered by a backfill limit), and conventional backfill scheduling may be performed around the top job party.

Referring to FIGS. 6A-6D, one approach to the ScheduleJob routine is presented. Processing begins by sorting the nodes array by earliest FreeTime first 600. That is, the nodes in the nodes array are sorted based on blocks of time in the future when the nodes will be free to perform work. Determination is then made whether there is an unprocessed node in the node array 605, and assuming "yes", processing determines whether the FreeTime for this node is greater than or equal to the wallclock time for the job undergoing scheduling 610. If "yes", then the node is saved on a potential node list for this job 615. After considering the node, processing determines whether enough nodes have been gathered for this job 620. If "no", then processing returns to obtain a next unprocessed node from the node array for consideration for possible inclusion in the potential node list for the job.

Once enough nodes have been gathered, or if there are no further unprocessed nodes in the node array, processing checks whether enough nodes have been gathered for this job 625 (see FIG. 6B). If "yes", then a node from the potential node list for this job is obtained 630, and processing records that this node is to be employed for this job by setting FreeTime equal to zero, setting node RunJobID equal to this job, setting the node wallclock time to the wallclock time for this job, and setting the BFStart for the node equal to the end of this running job 635. Thus, this node in subsequent calculations has a BFStart time equal to the end of this job. That is, in the future, other jobs can use this node once this job completes running. Processing then determines whether BFEnd has been set 640. Assuming that this is the first job being processed, then the answer is "no", and processing proceeds to set the BFEnd equal to the end of this running job 645. Together BFStart and BFEnd define the start and end of the backfill window for this node based on this running job. Next, processing determines whether there are more nodes in the potential nodes list for this job 650. If "yes", then return is made to obtain a next node from the potential node list and the above process repeats.

Once all nodes in the potential node list have been considered, or if there are insufficient nodes gathered for this job to process, then the nodes array is sorted by the earliest backfill end time and a "potential node stack" is cleared 655 (see FIG. 6C). Processing then determines whether more nodes are needed 660, and if "yes", then the node with the earliest backfill end time is pushed onto the potential node stack 665 for this job, and the variables LastNode is set to this node, and SetTime is set to the BFEnd time. Once a sufficient number of nodes are obtained, processing determines whether there are more nodes with the same BFEnd time 670, and if "yes", then these nodes are also pushed onto the potential node stack 665. Although this process actually collects more nodes than needed to run this job, efficiency is improved by collecting all nodes at the same backfill end time since nodes are employed in a reverse order of collection from the potential node stack.

Next, JobBFStart is set to the SetTime, and JobBFEnd is set to JobBFStart+JobWC 675. JobBFStart and JobBFEnd are temporary variables for this particular job. Next, a node from the potential node stack is obtained 680 and adjustments are considered. First, the node FreeTime may be adjusted 685, as well as the node BFStart time 690 and/or the node BFEnd time 695. If the FreeTime for this node has yet to be set, or if the current job is starting earlier than this node's current FreeTime setting, then the FreeTime for the node is adjusted to the future start time of the current job. Note that the node's FreeTime setting represents the future time that this node will become busy with the currently computed job schedule. Adjusting the node BFStart time is necessary if the node's BFStart time has yet to be set, or if the BFStart time for the job is less than the current BFStart time for this node, in which case the node's BFStart time is set to the BFStart time for the current job. The node BFEnd time is adjusted if the job's BFEnd time is greater than the node's BFEnd time. In this case, the node's BFEnd time is set to the job's BFEnd time.

This job is then added to the nodes FutureJob structure 700, and processing determines whether enough nodes have been collected to run this job 705. If "no", then a next node from the potential node stack is obtained. Otherwise, processing sets a return code (RC) equal to the jobID for this job 710 (see FIG. 6D). A determination is then made whether more nodes are on the node array 715, and if "yes", then a node from the node array is obtained 720, and processing determines whether the BFStart time for this node is less than or equal to zero 725. If the BFStart time is less than or equal to zero, then the node has no backfill window coverage, and the return code (RC) is set to zero 730, meaning that processing will continue with return 735 to the point of call of the ScheduleJob routine 530 of FIG. 5. That is, with the return code set to zero, the "LastJob" remains unset, and a next job is considered for inclusion in the top job party.

Figure 7:
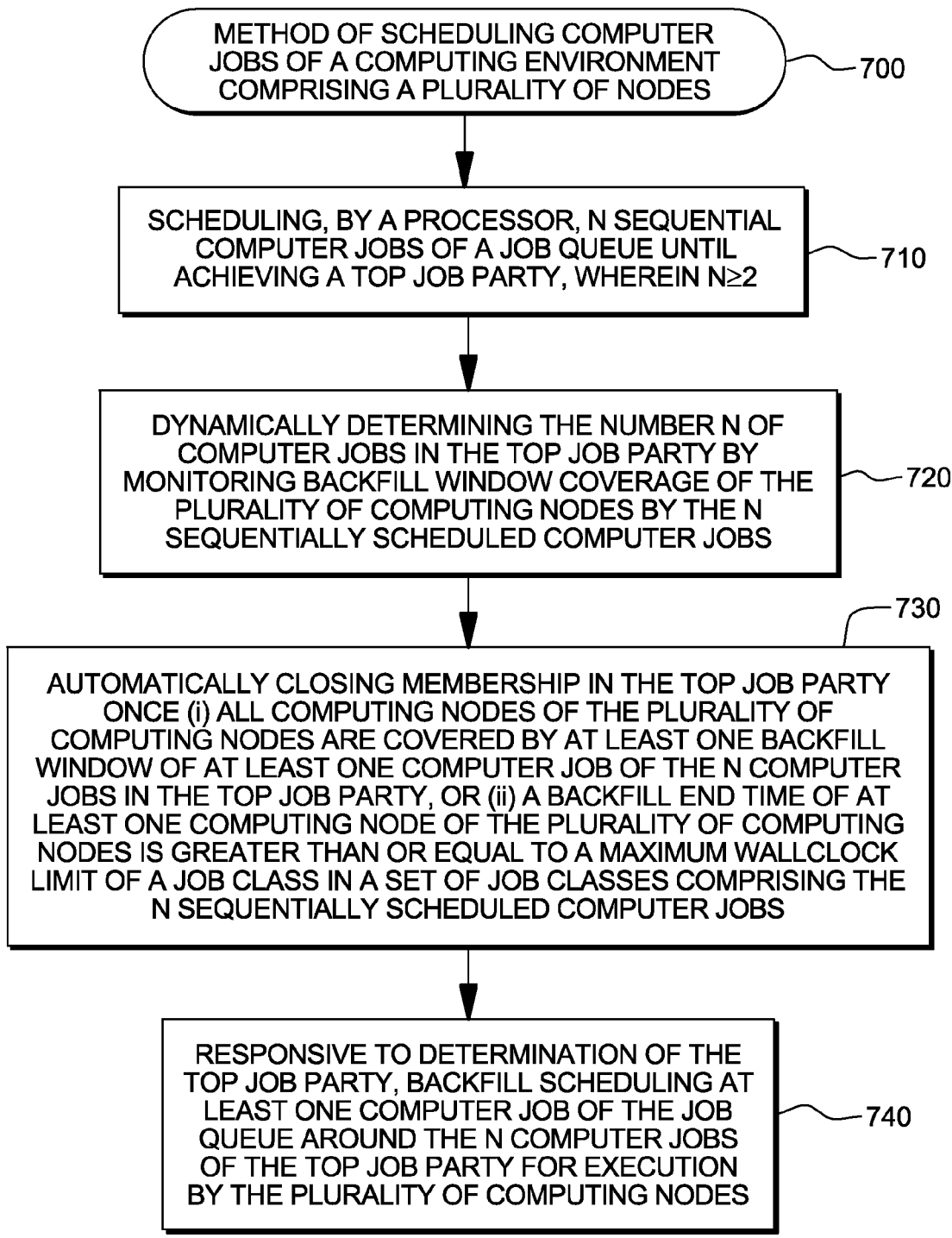
FIG. 7 is a flowchart of one embodiment of a method of scheduling computer jobs of a computing environment comprising a plurality of nodes, in accordance with an aspect of the present invention.

FIG. 7 is a flowchart of a method of scheduling jobs of a computing environment comprising a plurality of nodes, in accordance with an aspect of the present invention 700. The method includes scheduling, by a processor, N sequential computer jobs of a job queue until achieving a top job party, wherein N≧2, 710. The number N of computer jobs in the top job party is dynamically determined by monitoring backfill widow coverage of the plurality of computing nodes by the N sequentially scheduled computer jobs 720, Processing then automatically closes membership in the top job party once (i) all computing nodes of the plurality of computing nodes are covered by at least one backfill window of at least one computer job of the N computer jobs in the top job party, or (ii) a backfill end time of at least one computing node of the plurality of computing nodes is greater than or equal to a maximum wallclock limit of a job class in a set of job classes comprising the N sequentially scheduled computer jobs 730. Responsive to determining the top job party, processing then backfill schedules at least one computer job of the job queue around the N computer jobs of the top job party for execution by the plurality of computing nodes 740.

The above-described top job party algorithm has a number of clear advantages over known alternatives:

1) A dynamically determined, Capped Backfill termination—Before the top job party approach described herein, the methods proposed for backfill termination included a set integer number of jobs (which cannot guarantee correct termination) or complete backfill, which is computationally intensive.
2) The top job party algorithm provides a robust solution to the "free node" problem without excessive computational requirements.
3) The top job party algorithm is parameter free—that is, the scheduler administrator need not set any parameter (s) to tune the top job party. Operation of the algorithm is automatic.
4) The data structures used in the top job party algorithm allow a graphical representation of the future job schedule. This can be further developed into a window based view of the future schedule.

The detailed description presented above is discussed in terms of program procedures executed on a computer or network of computers. These procedural descriptions and representations are used by those skilled in the art to most effectively convey the substance of their work to others skilled in the art. They may be implemented in hardware or software, or a combination of the two.

A procedure is here, and generally, conceived to be a sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, objects, attributes or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or similar devices.

Each step of the method may be executed on any general computer, such as a mainframe computer, personal computer or the like and pursuant to one or more, or a part of one or more, program modules or objects generated from any programming language, such as C++, Java, Fortran or the like. And still further, each step, or a file or object or the like implementing each step, may be executed by special purpose hardware or a circuit module designed for that purpose.

The invention is preferably implemented in a high level procedural or object-oriented programming language to communicate with a computer. However, the invention can be implemented in assembly or machine language, if desired. In any case, the language may be a compiled or interpreted language.

The invention may be implemented as a mechanism or a computer program product comprising a recording medium. Such a mechanism or computer program product may include, but is not limited to CD-ROMs, diskettes, tapes, hard drives, computer RAM or ROM and/or the electronic, magnetic, optical, biological or other similar embodiment of the program. Indeed, the mechanism or computer program product may include any solid or fluid transmission medium, magnetic or optical, or the like, for storing or transmitting signals readable by a machine for controlling the operation of a general or special purpose programmable computer according to the method of the invention and/or to structure its components in accordance with a system of the invention.

The invention may also be implemented in a system. A system may comprise a computer that includes a processor and a memory device and optionally, a storage device, an output device such as a video display and/or an input device such as a keyboard or computer mouse. Moreover, a system may comprise an interconnected network of computers. Computers may equally be in stand-alone form (such as the traditional desktop personal computer) or integrated into another apparatus (such the electronic test equipment). The system may be specially constructed for the required purposes to perform, for example, the method steps of the invention or it may comprise one or more general purpose computers as selectively activated or reconfigured by a computer program in accordance with the teachings herein stored in the computer(s). The procedures presented herein are not inherently related to a particular computer system or other apparatus. The required structure for a variety of these systems will appear from the description given.

Again, the capabilities of one or more aspects of the present invention can be implemented in software, firmware, hardware or some combination thereof.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Additionally, at least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of scheduling computer jobs of a computing environment comprising a plurality of computing nodes, the method comprising:

scheduling, by a processor, N sequential computer jobs of a job queue until achieving a top job party, wherein N≧2, and the number N of computer jobs in the top job party is dynamically determined by monitoring backfill window coverage of the plurality of computing nodes by the N sequentially scheduled computer jobs and automatically closing membership in the top job party once (i) all computing nodes of the plurality of computing nodes are covered by at least one backfill window of at least one computer job of the N computer jobs in the top job party, or (ii) a backfill end time of at least one computing node of the plurality of computing nodes is greater than or equal to a maximum wallclock limit of a job class in a set of job classes comprising the N sequentially scheduled computer jobs; and responsive to determination of the top job party, backfill scheduling at least one computer job of the job queue around the N computer jobs of the top job party for execution by the plurality of computing nodes.

2. The method of claim 1, wherein the number N of computer jobs in the top job party is less than a number of computer jobs in the job queue awaiting execution by the plurality of computing nodes, and wherein the N sequential computer jobs comprise N sequential top computer jobs in the job queue.

3. The method of claim 2, wherein each computer job of the job queue has an associated computing node requirement and wallclock time indicative of an amount of time required to run the computer job, and wherein the scheduling comprises employing the computing node requirements and wallclock times of the N computer jobs in determining when to close membership in the top job party.

4. The method of claim 1, wherein the scheduling comprises assigning a start time to each of the computer jobs of the N computer jobs in the top job party.

5. The method of claim 1, wherein the dynamically determining further comprises sorting computing nodes of the plurality of computing nodes by earliest free time initially, and for each computer job considered for inclusion in the top job party, determining whether free time of at least one computing node is greater than or equal to a wallclock time for the computer job considered for inclusion, and if so, saving the at least one computer node on a potential node list for execution of the computer job, and for each node of the potential node list, setting a backfill end time equal to a projected end time of the computer job once running on the computer node, and setting a return code equal to a job ID for the computer job.

6. The method of claim 5, wherein the closing membership comprises determining that all computing nodes of the plurality of computing nodes have a backfill start time greater than zero, thereby indicating closure of membership in the top job party.

7. The method of claim 5, wherein when there are insufficient computer nodes in the potential nodes list to execute the computer job, the method further comprises sorting the plurality of computer nodes by earliest backfill end time and pushing computer nodes onto a potential node stack by earliest backfill end time until a sufficient number of computer nodes are accumulated to execute the computer job, and determining whether at least one additional computer node of the plurality of computer nodes has a same backfill end time as the backfill end time for a last computer node on the potential node stack, and if so, adding the at least one additional computer node with the same backfill end time to the potential node stack, and removing computer nodes from the potential node stack in reverse order to placement on the stack, the removed nodes being designated to execute the computer job.

8. The method of claim 7, further comprising adjusting node free time for at least one computer node of the potential node stack to reduce the node free time based upon inclusion of the computer job in the top job party.

9. A computer system for scheduling computer jobs of a computing environment comprising a plurality of computing nodes, the computer system comprising:

a memory; and a processor in communications with the memory, wherein the computer system is configured to perform a method, said method comprising:

scheduling N sequential computer jobs of a job queue until achieving a top job party, wherein N≧2, and the number N of computer jobs in the top job party is dynamically determined by monitoring backfill window coverage of the plurality of computing nodes by the N sequentially scheduled computer jobs and automatically closing membership in the top job party once (i) all computing nodes of the plurality of computing nodes are covered by at least one backfill window of at least one computer job of the N computer jobs in the top job party, or (ii) a backfill end time of at least one computing node of the plurality of computing nodes is greater than or equal to a maximum wallclock limit of a job class in a set of job classes comprising the N sequentially scheduled computer jobs; and backfill scheduling, responsive to determination of the top job party, at least one computer job of the job queue around the N computer jobs of the top job party for execution by the plurality of computing nodes.

10. The computer system of claim 9, wherein the number N of computer jobs in the top job party is less than a number of computer jobs in the job queue awaiting execution by the plurality of computing nodes, and wherein the N sequential computer jobs comprise N sequential top computer jobs in the job queue.

11. The computer system of claim 10, wherein each computer job of the job queue has an associated computing node requirement and wallclock time indicative of an amount of time required to run the computer job, and wherein the scheduling comprises employing the computing node requirements and wallclock times of the N computer jobs in determining when to close membership in the top job party.

12. The computer system of claim 9, wherein the scheduling comprises assigning a start time to each of the computer jobs of the N computer jobs in the top job party.

13. The computer system of claim 9, wherein the dynamically determining further comprises sorting computing nodes of the plurality of computing nodes by earliest free time initially, and for each computer job considered for inclusion in the top job party, determining whether free time of at least one computing node is greater than or equal to a wallclock time for the computer job considered for inclusion, and if so, saving the at least one computer node on a potential node list for execution of the computer job, and for each node of the potential node list, setting a backfill end time equal to a projected end time of the computer job once running on the computer node, and setting a return code equal to a job ID for the computer job.

14. The computer system of claim 13, wherein when there are insufficient computer nodes in the potential nodes list to execute the computer job, the method further comprises sorting the plurality of computer nodes by earliest backfill end time and pushing computer nodes onto a potential node stack by earliest backfill end time until a sufficient number of computer nodes are accumulated to execute the computer job, and determining whether at least one additional computer node of the plurality of computer nodes has a same backfill end time as the backfill end time for a last computer node on the potential node stack, and if so, adding the at least one additional computer node with the same backfill end time to the potential node stack, and removing computer nodes from the potential node stack in reverse order to placement on the stack, the removed nodes being designated to execute the computer job.

15. A computer program product for scheduling computer jobs of a computing environment comprising a plurality of computing nodes, the computer program product comprising;
a non-transitory storage medium readable by a processor and storing instructions for execution by the processor to perform a method comprising:
scheduling N sequential computer jobs of a job queue until achieving a top job party, wherein N≧2, and the number N of computer jobs in the top job party is dynamically determined by monitoring backfill window coverage of the plurality of computing nodes by the N sequentially scheduled computer jobs and automatically closing membership in the top job party once (i) all computing nodes of the plurality of computing nodes are covered by at least one backfill window of at least one computer job of the N computer jobs in the top job party, or (ii) a backfill end time of at least one computing node of the plurality of computing nodes is greater than or equal to a maximum wallclock limit of a job class in a set of job classes comprising the N sequentially scheduled computer jobs; and
responsive to determination of the top job party, backfill scheduling at least one computer job of the job queue around the N computer jobs of the top job party for execution by the plurality of computing nodes.

16. The computer program product of claim 15, wherein the number N of computer jobs in the top job party is less than a number of computer jobs in the job queue awaiting execution by the plurality of computing nodes, and wherein the N sequential computer jobs comprise N sequential top computer jobs in the job queue.

17. The computer program product of claim 16, wherein each computer job of the job queue has an associated computing node requirement and wallclock time indicative of an amount of time required to run the computer job, and wherein the scheduling comprises employing the computing node requirements and wallclock times of the N computer jobs in determining when to close membership in the top job party.

18. The computer program product of claim 15, wherein the scheduling comprises assigning a start time to each of the computer jobs of the N computer jobs in the top job party.

19. The computer program product of claim 15, wherein the dynamically determining further comprises sorting computing nodes of the plurality of computing nodes by earliest free time initially, and for each computer job considered for inclusion in the top job party, determining whether free time of at least one computing node is greater than or equal to a wallclock time for the computer job considered for inclusion, and if so, saving the at least one computer node on a potential node list for execution of the computer job, and for each node of the potential node list, setting a backfill end time equal to a projected end time of the computer job once running on the computer node, and setting a return code equal to a job ID for the computer job.

20. The computer program product of claim 19, wherein when there are insufficient computer nodes in the potential nodes list to execute the computer job, the method further comprises sorting the plurality of computer nodes by earliest backfill end time and pushing computer nodes onto a potential node stack by earliest backfill end time until a sufficient number of computer nodes are accumulated to execute the computer job, and determining whether at least one additional computer node of the plurality of computer nodes has a same backfill end time as the backfill end time for a last computer node on the potential node stack, and if so, adding the at least one additional computer node with the same backfill end time to the potential node stack, and removing computer nodes from the potential node stack in reverse order to placement on the stack, the removed nodes being designated to execute the computer job.

* * * * *